United States Patent
Jacob et al.

(10) Patent No.: US 11,585,826 B2
(45) Date of Patent: Feb. 21, 2023

(54) THIN FILM HEATER ON A SLEEVE OUTER SURFACE IN A STRUT PORTION AND/OR A PROBE HEAD OF AN AIR DATA PROBE

(71) Applicant: Rosemount Aerospace Inc., Burnsville, MN (US)

(72) Inventors: Robin Jacob, Bangalore (IN); Guru Prasad Mahapatra, Karnataka (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 615 days.

(21) Appl. No.: 16/695,874

(22) Filed: Nov. 26, 2019

(65) Prior Publication Data

US 2021/0022215 A1 Jan. 21, 2021

(30) Foreign Application Priority Data

Jul. 19, 2019 (IN) .............................. 201911029232

(51) Int. Cl.
| | |
|---|---|
| *G01P 5/165* | (2006.01) |
| *G01F 1/46* | (2006.01) |
| *H05B 3/44* | (2006.01) |
| *H05B 3/46* | (2006.01) |

(52) U.S. Cl.
CPC ............... *G01P 5/165* (2013.01); *G01F 1/46* (2013.01); *H05B 3/44* (2013.01); *H05B 3/46* (2013.01)

(58) Field of Classification Search
None
See application file for complete search history.

(56) References Cited

U.S. PATENT DOCUMENTS

| | | | |
|---|---|---|---|
| 2,254,155 | A | 8/1941 | Reichel |
| 4,121,088 | A | 10/1978 | Doremus et al. |
| 6,070,475 | A | 6/2000 | Muehlhauser et al. |
| 10,132,824 | B2 | 11/2018 | Benning et al. |
| 10,197,588 | B2 | 2/2019 | Wong et al. |
| 2015/0344137 | A1 | 12/2015 | Bartz et al. |
| 2016/0221680 | A1 | 8/2016 | Burton et al. |
| 2017/0370960 | A1* | 12/2017 | Benning ............... G01K 13/028 |
| 2021/0127458 | A1* | 4/2021 | Jacob ....................... H05B 3/58 |

FOREIGN PATENT DOCUMENTS

| | | |
|---|---|---|
| EP | 3321692 A1 | 5/2018 |
| KR | 101184780 B1 | 9/2012 |

OTHER PUBLICATIONS

European Search Report for European Application No. 19212731.4, dated Jun. 12, 2020, 7 pages.

* cited by examiner

*Primary Examiner* — Harshad R Patel
(74) *Attorney, Agent, or Firm* — Cantor Colburn LLP

(57) ABSTRACT

An air date probe includes a base portion, a strut portion extending from the base portion, and a tube assembly secured to an extending from the strut portion. One or more of the tube assembly or the strut portion includes a sleeve member having a sleeve outer surface positioned at a sleeve frustum angle relative to a sleeve member axis. A thin film heater is positioned at the sleeve outer surface, and the tin film heater and the sleeve member are positioned in a housing member. The housing member has a housing inner surface having a housing frustum angle such that the thin film heater is retained by compression between the housing member inner surface and the sleeve member outer surface.

18 Claims, 5 Drawing Sheets

THIN FILM HEATER ON A SLEEVE OUTER SURFACE IN A STRUT PORTION AND/OR A PROBE HEAD OF AN AIR DATA PROBE

FOREIGN PRIORITY

This application claims priority to India Patent Application No. 201911029232, filed Jul. 19, 2019, and all the benefits accruing therefrom under 35 U.S.C. § 119, the contents of which in its entirety are herein incorporated by reference.

BACKGROUND

Exemplary embodiments pertain to the art of aircraft sensors such as air data probes, and more particularly to heating of air data probes for icing prevention under cold weather conditions.

Air data probes, such as pitot tubes are mounted to exterior surfaces of an aircraft and are widely used to determine airspeed of the aircraft. Due to their location, the air data probes are subjected to extremely cold conditions, and are typically heated to prevent and/or remove ice accumulation one or in the air data probe.

Conventionally, air data probes are heated via resistive heating where an electrically resistive metal wire is energized electrically whenever required to provide heating. On the air data probe housing, the wire is wound in a coil form about the housing and secured by brazing. On the probe strut, which supports the probe housing, the wire is laid out on surface grooves formed in the strut and an additional layer of brazing is provided on the wire. A subsequent grinding or other finishing operation is performed to obtain a desired aerodynamic profile of the air data probe.

Such a manufacturing operation is complex and requires meticulous workmanship and machinery to ensure correct assembly of the heater wires to the air data probe. Further, such heating elements are prone to single point failure, in particular due to thermal fatigue or material degradation, which requires replacement of the entire air data probe.

BRIEF DESCRIPTION

In one embodiment, an air date probe includes a base portion, a strut portion extending from the base portion, and a tube assembly secured to an extending from the strut portion. One or more of the tube assembly or the strut portion includes a sleeve member having a sleeve outer surface positioned at a sleeve frustum angle relative to a sleeve member axis. A thin film heater is positioned at the sleeve outer surface, and the tin film heater and the sleeve member are positioned in a housing member. The housing member has a housing inner surface having a housing frustum angle such that the thin film heater is retained by compression between the housing member inner surface and the sleeve member outer surface.

Additionally or alternatively, in this or other embodiments the sleeve frustum angle is substantially equal to the housing frustum angle.

Additionally or alternatively, in this or other embodiments the sleeve frustum angle and the housing frustum angle are between 0.5 and 20 degrees.

Additionally or alternatively, in this or other embodiments the thin film heater is one of a positive temperature coefficient heater based on carbon black/polymer composites or a carbon nanotube/silicone nano-composite heater.

Additionally or alternatively, in this or other embodiments the thin film heater has a thickness of about 0.03".

Additionally or alternatively, in this or other embodiments an adhesive layer is applied to the thin film heater to ensure contact with the inner housing surface.

Additionally or alternatively, in this or other embodiments the sleeve member of the tube assembly includes a tube inlet at a first end of the sleeve member of the tube assembly.

Additionally or alternatively, in this or other embodiments the sleeve frustum angle is configured such that the sleeve outer surface has a reducing radial distance from the sleeve axis with reducing distance from the tube inlet.

Additionally or alternatively, in this or other embodiments a step is located in the sleeve outer surface at a throat of the sleeve member.

Additionally or alternatively, in this or other embodiments the thin film heater includes one or more insulation layers.

Additionally or alternatively, in this or other embodiments a sealant is applied to the air data probe to prevent corrosive material intrusion between the housing member and the sleeve member.

Additionally or alternatively, in this or other embodiments one or more of the sleeve member or the housing member is formed from a metallic material.

In one embodiment, a method of forming an air data probe includes applying a thin film heater to a sleeve outer surface of a sleeve member, the sleeve outer surface having a sleeve frustum angle relative to a sleeve central axis. A housing member is installed over the thin film heater. The housing member has a housing inner surface at a housing frustum angle thereby securing the thin film heater via compression between the housing inner surface and the sleeve outer surface. The housing member is one of a strut housing or a tube housing of an air data probe.

Additionally or alternatively, in this or other embodiments an adhesive is applied to the thin film heater prior to installing the housing member to ensure contact with the inner housing surface.

Additionally or alternatively, in this or other embodiments a sealant is applied to prevent corrosive material intrusion between the housing member and the sleeve member.

Additionally or alternatively, in this or other embodiments the sleeve frustum angle is substantially equal to the housing frustum angle.

Additionally or alternatively, in this or other embodiments the thin film heater is one of a positive temperature coefficient heater based on carbon black/polymer composites or a carbon nanotube/silicone nano-composite heater.

Additionally or alternatively, in this or other embodiments one or more insulation layers are applied to the thin film heater.

Additionally or alternatively, in this or other embodiments the sleeve frustum angle and the housing frustum angle are between 0.5 and 20 degrees.

Additionally or alternatively, in this or other embodiments the thin film heater has a thickness of about 0.03".

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
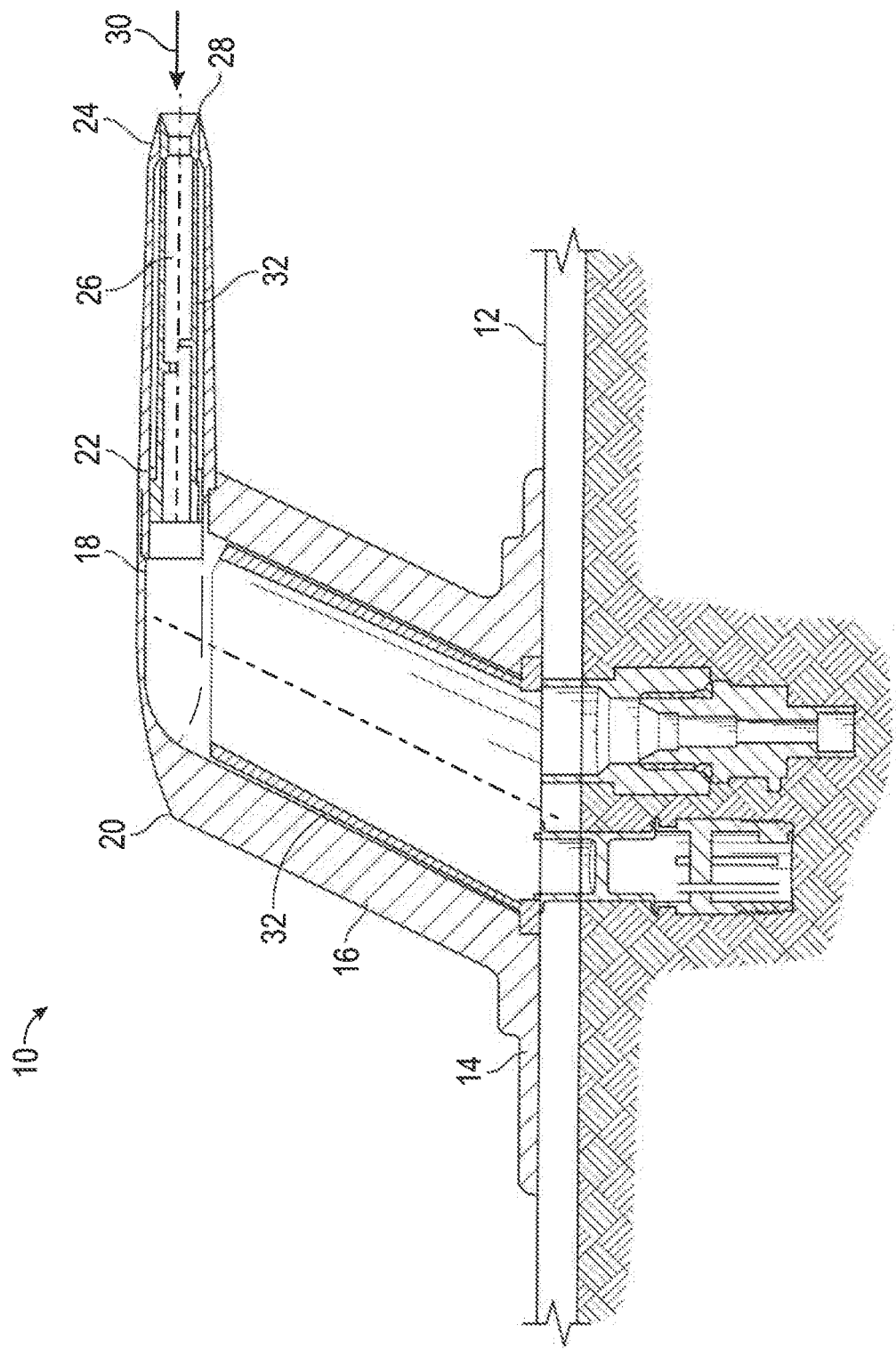
FIG. 1 is an illustration of an embodiment of an air data tube.

FIG. 1 is an illustration of an air data probe, in particular a pitot tube 10. The pitot tube 10 is secured to an external surface 12 of an aircraft or other structure. The pitot tube 10 includes a base 14 located at the external surface 12, and a strut 16 extending from the base 14. A tube assembly 18 is located at a strut end 20. The tube assembly 18 includes a cylindrical body portion 22 and a tip portion 24 extending along a tube axis 26 from the body portion 22 to a tube inlet 28 which allows and airflow 30 to enter the tube assembly 18.

The pitot tube 10 is configured to include one or more thin-film heating elements assembled thereinto. The thin film heater 32 may be formed from, for example, nanocomposites of carbon allotropes, and may include positive temperature coefficient (PTC) heaters based on carbon black/polymer composites or carbon nanotube/silicone nano-composite (CNT) heaters. Thin film heaters 32 generate surface heating when electrically energized depending on the electric resistivity-temperature characteristics of the thin film heater 32 material.

Figure 2:
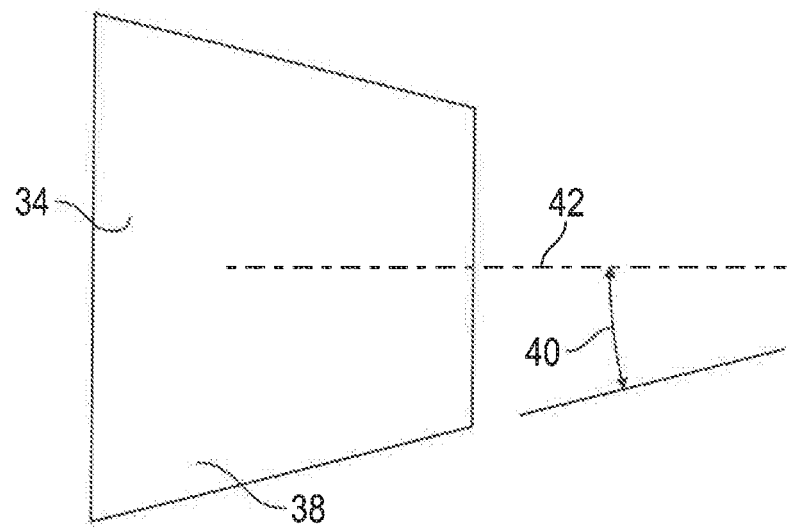
FIG. 2 is an illustration of an embodiment of a primary frustum.
Figure 3:
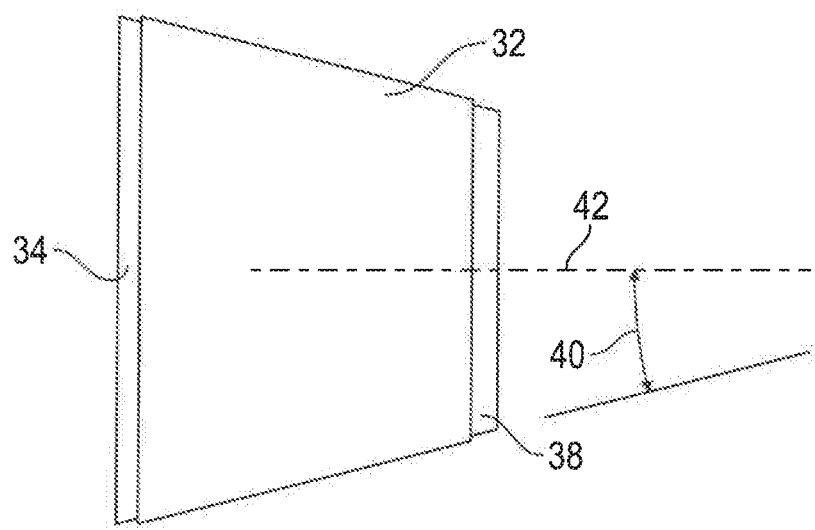
FIG. 3 is an illustration of an embodiment of a thin film heater installed on a primary frustum.
Figure 4:
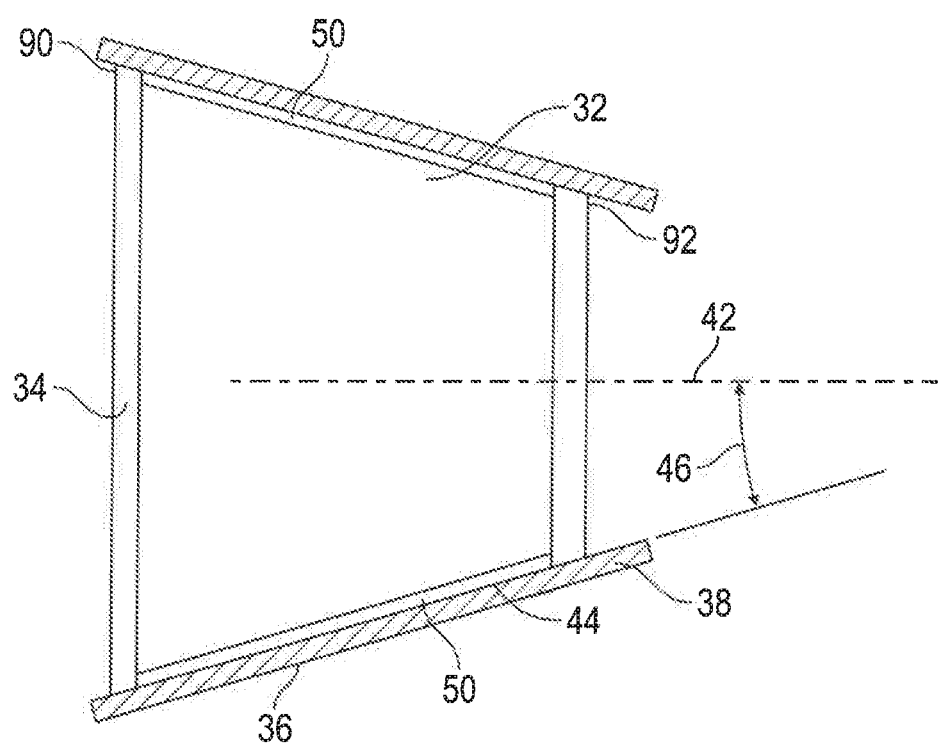
FIG. 4 is an illustration of an embodiment of a secondary frustum installed over the thin film heater.

As illustrated in FIGS. 2-4, the thin film heater 32 is installed and secured between two frustum elements, in particular a primary frustum 34 and a secondary frustum 36. In some embodiments, the primary frustum 34 and the secondary frustum 36 are formed from a metallic material, such as a nickel material. The primary frustum 34 has a primary frustum surface 38 at a primary frustum angle 40 relative to a central axis 42 of the primary frustum 34. Referring to FIG. 3, the thin film heater 32 is applied to the primary frustum surface 38. The sub assembly of the primary frustum 34 and the thin film heater 32 is then inserted into an interior of the hollow secondary frustum 36. In some embodiments, the secondary frustum 36 has a secondary frustum surface 44 at a secondary frustum angle 46 relative to the central axis 42. In some embodiments the primary frustum angle 40 and the secondary frustum angle 46 are between 0 degrees and 20 degrees, in other embodiments between 0.5 degrees and 20 degrees. In such an assembly, the thin film heater 32 is locked in place due to compression between the primary frustum surface 38 and the secondary frustum surface 44. In some embodiments, adhesive may be applied to the thin film heater 32 and/or to the secondary frustum surface 44 to ensure sufficient contact between the thin film heater 32 and the secondary frustum surface 44. Additionally, the thin film heater 32 may include one or more insulation layers 50 to prevent current leakage from and short circuit of the thin film heater 32. In some embodiments, the combined thickness of the thin film heater 32 and the insulation layers 50 is on the order of 0.03". Further, end regions 90, 92 of the assembly are sealed to prevent the thin film heater 32 from being subjected to external corrosive elements.

Figure 5:
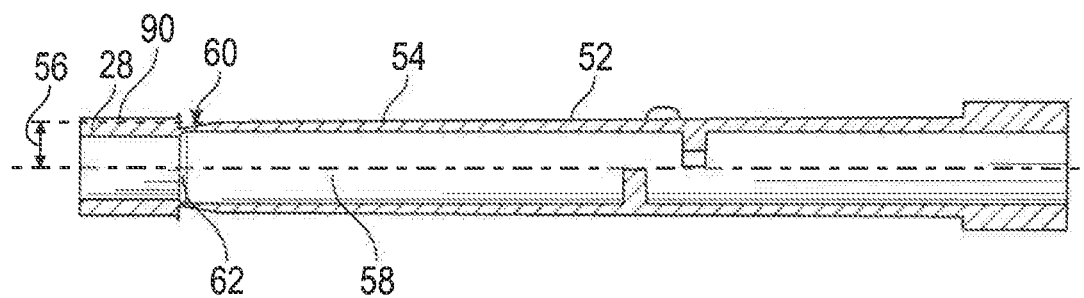
FIG. 5 is a cross-sectional view of an embodiment of a tube sleeve.

Such a construction may be utilized on one or more of the strut 16 or the tube assembly 18 of the pitot tube 10. Referring to FIG. 5, the tube assembly 18 is constructed with a hollow tube sleeve 52 terminating at one end at the tube inlet 28. The tube sleeve 52 has a sleeve outer surface 54 having a sleeve frustum angle 56 relative to a tube axis 58. The sleeve frustum angle 56 is configured such that the sleeve outer surface 54 has a reducing radial distance from the tube axis 58 with reducing distance from the tube inlet 28. Further, in some embodiments, the sleeve outer surface 54 has a further tapered portion 60 at or near a throat 62 of the tube assembly 18. The tube sleeve 52 includes a cylindrical surface 90 at or near the tube inlet 28.

Figure 6:
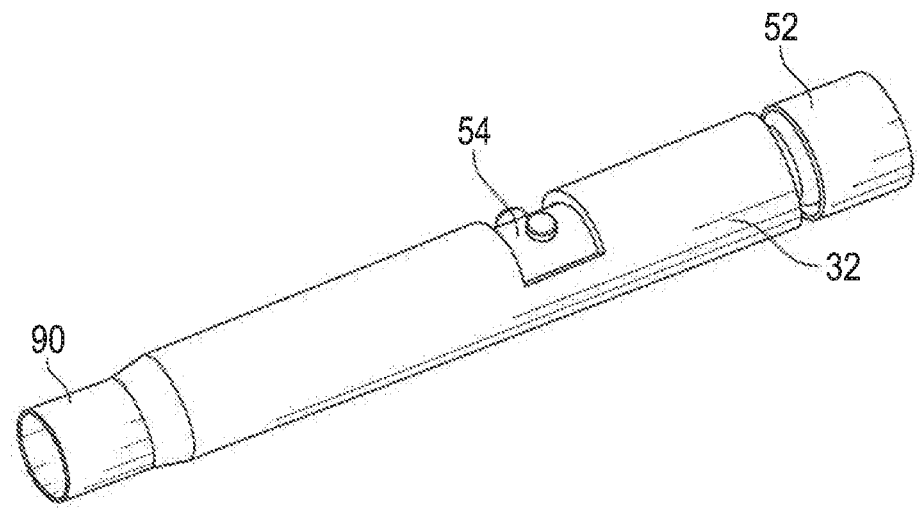
FIG. 6 is a perspective view of a thin film heater installed to a tube sleeve.
Figure 7:
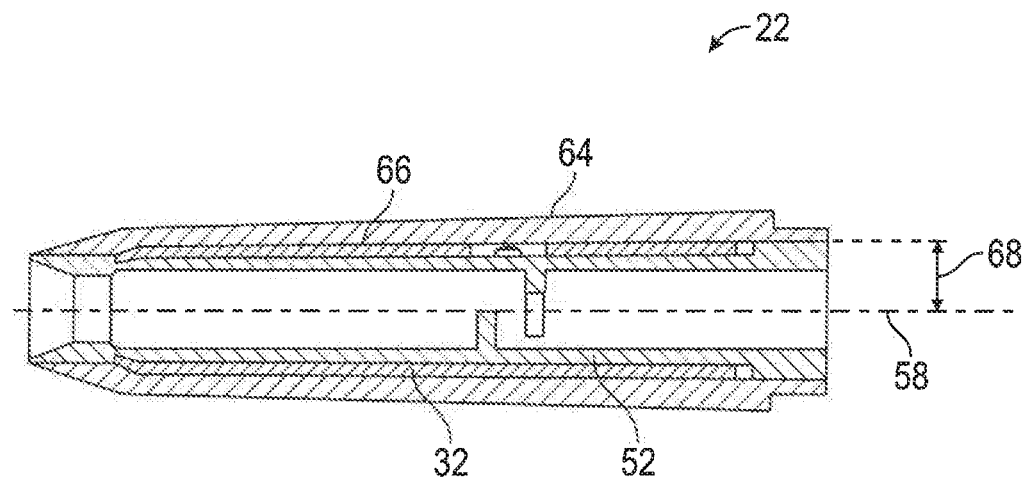
FIG. 7 is a cross-sectional view of a tube assembly of an air data probe.

Referring now to FIG. 6, the thin film heater 32 is installed to or wrapped about the sleeve outer surface 54, and as shown in FIG. 7, a tube housing 64 is installed over the thin film heater 32 and tube sleeve 52 subassembly. The tube housing 64 is a hollow, tubular structure with an inner housing surface 66. The inner housing surface 66 has a housing frustum angle 68, which in some embodiments equals the sleeve frustum angle 56. The cylindrical surface 90 allows for brazing of the tube sleeve 52 to the tube housing 64 during assembly without damaging the thin film heater 32.

Figure 8:
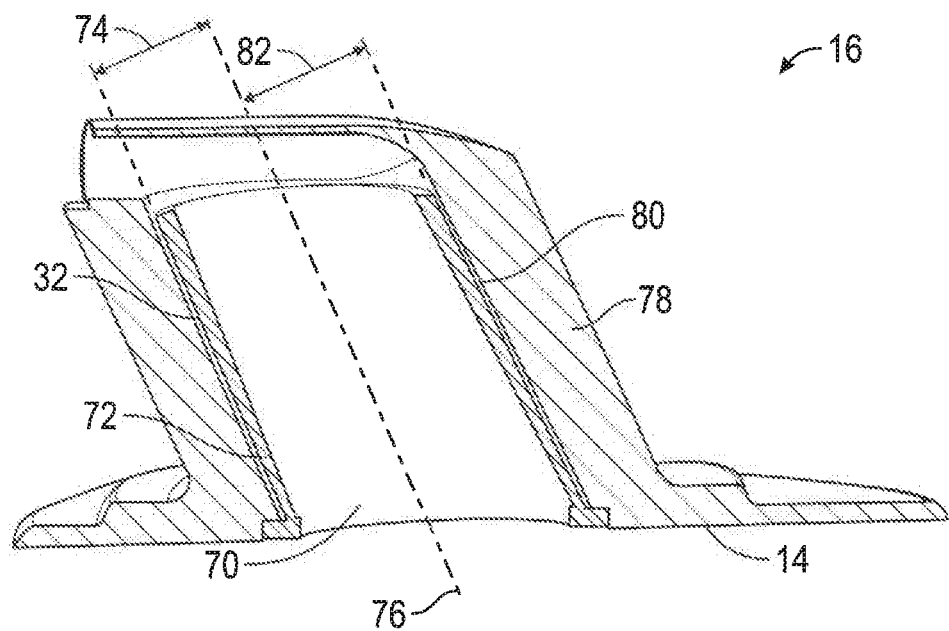
FIG. 8 is a cross-sectional view of a strut assembly of an air data probe.

Referring to FIG. 8, the strut 16 is constructed with a strut sleeve 70 terminating at one end at the base 14. The strut sleeve 70 has a strut sleeve outer surface 72 having a strut sleeve frustum angle 74 relative to a strut axis 76. The strut sleeve frustum angle 74 is configured such that the strut sleeve outer surface 72 has a reducing radial distance from the strut axis 76 with increasing distance from the base 14.

The thin film heater 32 is installed to or wrapped about the strut sleeve outer surface 74, a strut housing 78 is installed over the thin film heater 32 and strut sleeve 70 subassembly. The strut housing 78 is a hollow structure with a strut housing inner surface 80. The strut housing inner surface 80 has a strut housing frustum angle 82, which in some embodiments equals the strut sleeve frustum angle 74.

The pitot tube 10 configurations disclosed herein provide enhanced safety and pitot tube 10 service life by preventing heater failure, improved corrosion protection by avoiding exposure of the heater to external environment by encapsulating the heater within the pitot tube 10. Further, the configurations improve ease of assembly by eliminating or reducing brazing operations. Further, the heating profile of the pitot tube may be customized to meet requirements by, for example, modifying the electrical characteristics of the thin film heater 32 without changing an external design of the pitot tube 10.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air date probe, comprising: a base portion; a strut portion extending from the base portion; and a tube assembly secured to and extending from the strut portion; wherein one or more of the tube assembly or the strut portion includes: a sleeve member having a sleeve outer surface positioned at a sleeve frustum angle relative to a sleeve member axis; a thin film heater disposed at the sleeve outer surface; and a housing member into which the sleeve member and thin film heater are installed, the housing member having a housing inner surface having a housing frustum angle such that the thin film heater is retained by compression between the housing member inner surface and the sleeve member outer surface; wherein the sleeve member of the tube assembly includes a tube inlet at a first end of the sleeve member of the tube assembly; wherein the sleeve frustum angle is configured such that the sleeve outer surface has a reducing radial distance from the sleeve axis with reducing distance from the tube inlet.

2. The air data probe of claim 1, wherein the sleeve frustum angle is substantially equal to the housing frustum angle.

3. The air data probe of claim 1, wherein the sleeve frustum angle and the housing frustum angle are between 0.5 and 20 degrees.

4. The air data probe of claim 1, wherein the thin film heater is one of a positive temperature coefficient heater based on carbon black/polymer composites or a carbon nanotube/silicone nano-composite heater.

5. The air data probe of claim 1, wherein the thin film heater has a thickness of about 0.03".

6. The air data probe of claim 1, further comprising an adhesive layer applied to the thin film heater to ensure contact with the inner housing surface.

7. The air data probe of claim 1, further comprising a step in the sleeve outer surface at a throat of the sleeve member.

8. The air data probe of claim 1, wherein the thin film heater includes one or more insulation layers.

9. The air data probe of claim 1, further comprising a sealant applied to the air data probe to prevent corrosive material intrusion between the housing member and the sleeve member.

10. The air data probe of claim 1, wherein one or more of the sleeve member or the housing member is formed from a metallic material.

11. A method of forming an air data probe comprising:

applying a thin film heater to a sleeve outer surface of a sleeve member, the sleeve outer surface having a sleeve frustum angle relative to a sleeve central axis; and installing a housing member over the thin film heater, the housing member having a housing inner surface at a housing frustum angle thereby securing the thin film heater via compression between the housing inner surface and the sleeve outer surface;

wherein the housing member is one of a strut housing or a tube housing of an air data probe;

wherein the sleeve member of the tube assembly includes a tube inlet at a first end of the sleeve member of the tube assembly;

wherein the sleeve frustum angle is configured such that the sleeve outer surface has a reducing radial distance from the sleeve axis with reducing distance from the tube inlet.

12. The method of claim 11, further comprising applying an adhesive to the thin film heater prior to installing the housing member to ensure contact with the inner housing surface.

13. The method of claim 11, further comprising applying a sealant to prevent corrosive material intrusion between the housing member and the sleeve member.

14. The method of claim 11, wherein the sleeve frustum angle is substantially equal to the housing frustum angle.

15. The method of claim 11, wherein the thin film heater is one of a positive temperature coefficient heater based on carbon black/polymer composites or a carbon nanotube/silicone nano-composite heater.

16. The method of claim 11, further comprising applying one or more insulation layers to the thin film heater.

17. The method of claim 11, wherein the sleeve frustum angle and the housing frustum angle are between 0.5 and 20 degrees.

18. The method of claim 11, wherein the thin film heater has a thickness of about 0.03".

* * * * *